March 18, 1952 W. H. HOLCROFT 2,589,810
PROCESS FOR PREPARING GAS ATMOSPHERE
Filed March 29, 1948 2 SHEETS—SHEET 1

INVENTOR.
WALTER H. HOLCROFT
BY
Whittemore Hulbert & Belknap
ATTORNEYS

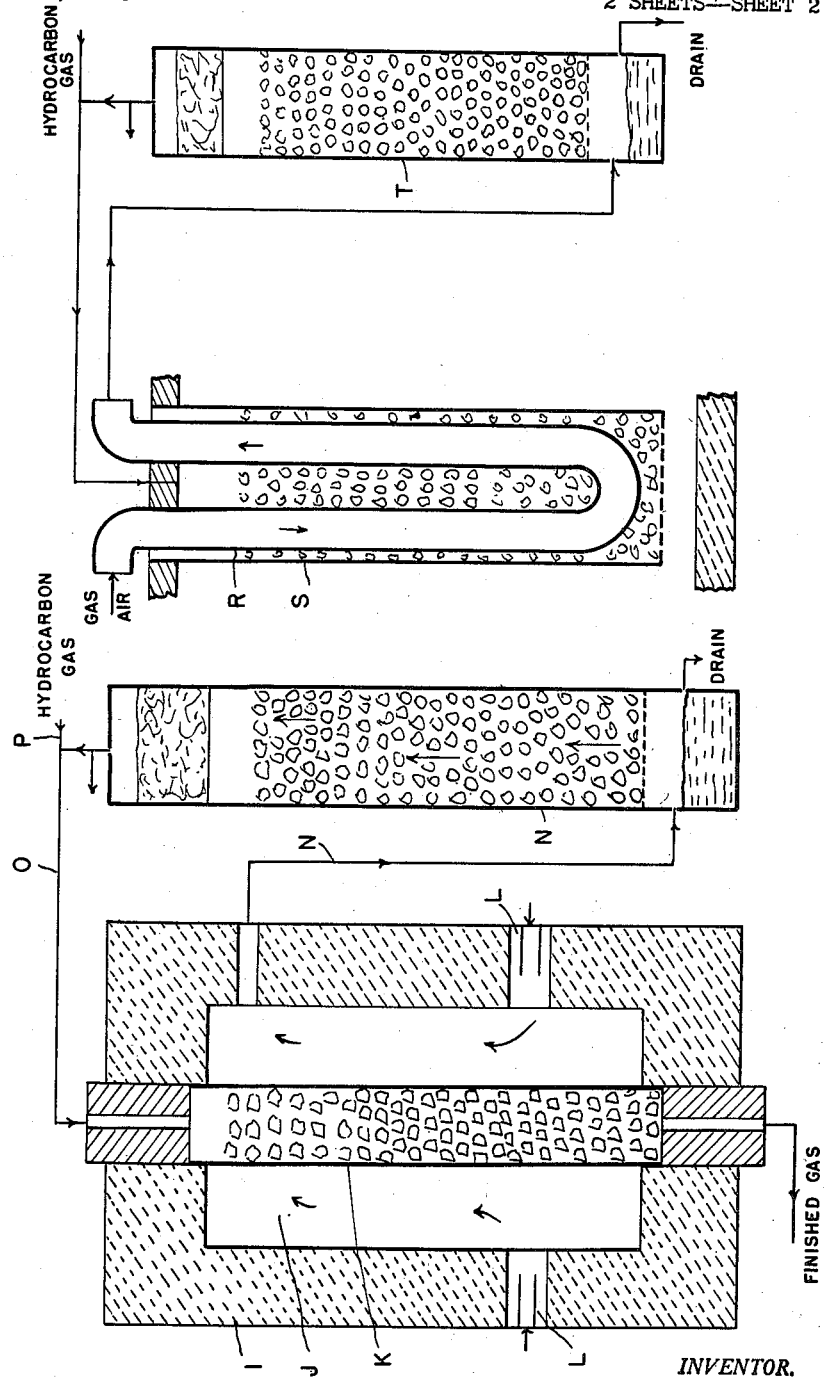

Patented Mar. 18, 1952

2,589,810

UNITED STATES PATENT OFFICE 2,589,810

PROCESS FOR PREPARING GAS ATMOSPHERE

Walter H. Holcroft, Detroit, Mich., assignor to Holcroft & Company, Detroit, Mich., a corporation of Michigan Application March 29, 1948, Serial No. 17,682

2 Claims. (Cl. 252—372)

The invention relates to manufacture of gas atmosphere for use in heat treating furnaces. It is the object of the invention to obtain a simplified process for the forming of the gas and one which has various advantageous features including the utilization of cheap and readily available materials, the obtaining of a well-balanced product, the conservation of heat units liberated during the process, the obtaining of greater length of life of the catalysts required. With these and other advantages in view the invention consists in the process as hereinafter set forth.

In the drawings:

Fig. 2 is a similar view showing a modified form of apparatus; and

Fig. 3 is a similar view showing still another modified form of apparatus.

Figure 1:
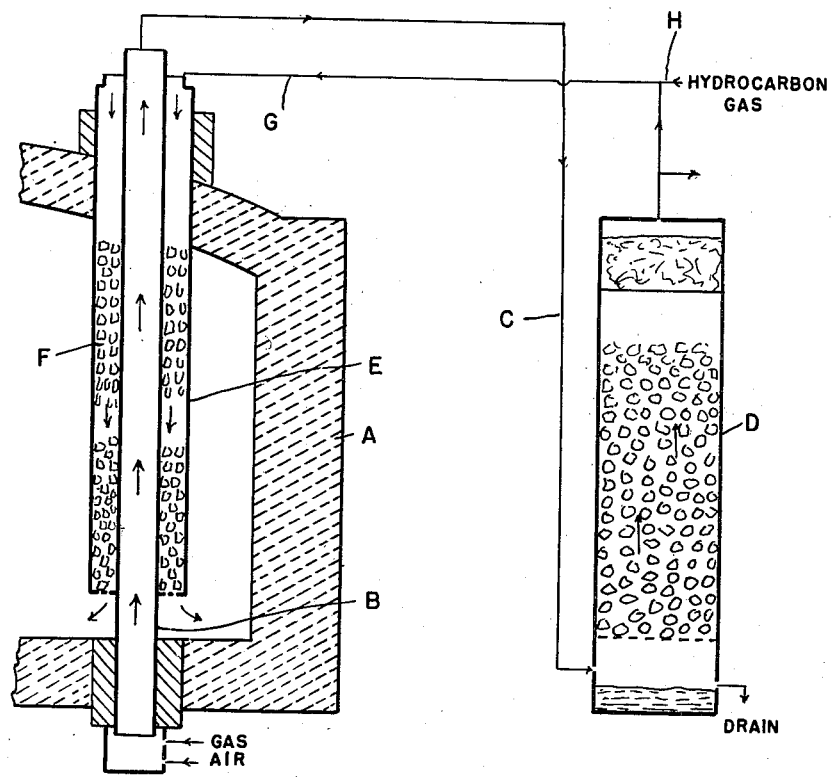
Fig. 1 is a diagrammatic view illustrating one type of apparatus used in carrying out my improved method.

Gas atmospheres used in heat treating furnaces contain as their major ingredients carbon monoxide (CO), hydrogen ($H_2$) and nitrogen ($N_2$). Such mixture can be formed by the burning of hydrocarbon fuel and a subsequent step of reducing the $CO_2$ content to CO as, for instance, by passing the gases through a retort containing heated charcoal. Another method heretofore employed is to effect a combination of hydrocarbon gases with the oxygen content of air by catalytic action. One source of hydrocarbon fuel available in some districts is natural gas, which has a large content of methane ($CH_4$). However such gas may contain impurities and particularly sulphur, which is detrimental both to the articles under heat treatment and to the catalyst where one is employed. For instance, where nickel is used as a catalyst, the presence of sulphur in the hydrocarbon gas causes deterioration. With my improved process, I dispense with the use of charcoal and the retort for containing the same. I also decrease the catalytic action required relative to the total volume of gas produced, and further conserve at least a portion of the heat units liberated during the process.

As illustrated in Fig. 1, A is a portion of a heat treating furnace which is to be constantly supplied with a gas atmosphere. B is a tube extending completely through the furnace A and which at its lower end is connected with the supply of proportioned hydrocarbon gas (natural gas, methane, propane, butane, etc.) and air. Combustion of this gas occurs during its passage upward through the tube B and the discharge products of combustion are carried through a conduit C to the base of a water tower D or other means of extracting the major part of the water vapor. The tube B is surrounded by a larger concentric tube E in which is placed the catalyst F. The upper end of the tube E is connected by a conduit G with the top of the water cooler so that the products of combustion in the tube B, after removal of the water content therefrom, will pass into the tube E and downward through the catalyst being finally discharged into the chamber of the furnace A. Before entering the tube E, the gaseous products have introduced therein through a conduit H a further quantity of hydrocarbon such as natural gas, and this is so proportioned as to combine with the $CO_2$ and $H_2O$ content under catalytic action. Thus the gas, which is eventually discharged from the lower end of the tube E, contains carbon monoxide (CO), nitrogen ($N_2$), and hydrogen ($H_2$). There are also minor constituents such as $CO_2$ and $H_2O$ but these are in balanced relation to the major constituents and so, far from being detrimental, are really advantageous in maintaining the balance. During the combustion of the gas and air within the tube B, the heat developed will be communicated to the catalyst within the tube E and is used to supply the heat absorbed by the endothermic reaction in this tube.

With the apparatus as illustrated in Figure 2, instead of effecting the combustion of gases inside of the tube containing the catalyst, the gas is burned outside of this tube. Thus as shown I is a casing having a combustion chamber J therein, and a tube K passing through the chamber J contains the catalyst. A proportioned mixture of gas and air is introduced through apertures L in the lower portion of the chamber J and is burned in this chamber around the tube K so as to heat the latter and the catalyst contained therein. The products of combustion pass from the chamber J through a conduit M into the base of a water cooler N which, as above described, extracts most of the water vapor. From the top of this cooler N, the gases enter a conduit O in which they are commingled with a proportionate quantity of hydrocarbon gas from a conduit P and the mixture is passed into the upper end of the tube K through the catalyst contained therein. From the lower end of the tube the gases pass through a conduit Q to any point desired. The successive steps of the process, as above described, may be expressed as follows:

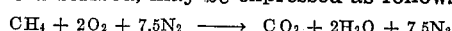
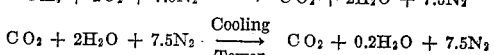
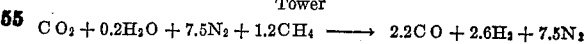

$$CH_4 + 2O_2 + 7.5N_2 \longrightarrow CO_2 + 2H_2O + 7.5N_2$$

$$CO_2 + 2H_2O + 7.5N_2 \xrightarrow{\text{Cooling Tower}} CO_2 + 0.2H_2O + 7.5N_2$$

$$CO_2 + 0.2H_2O + 7.5N_2 + 1.2CH_4 \longrightarrow 2.2CO + 2.6H_2 + 7.5N_2$$

As above mentioned, natural gas frequently has a sulphur content. Where this is the case, the sulphur during combustion will be converted to $SO_2$ which will be eliminated in the water cooler.

Various forms of apparatus may be used for carrying out my improved method and in addition to the constructions shown in Figs. 1 and 2, respectively, I may use the construction shown in Fig. 3. In this a U-shaped tube R extends vertically within the furnace chamber and is supplied with a proportioned mixture of air and hydrocarbon for active combustion within the tube. Adjacent to this tube is a container S for the catalyst which receives radiant heat from the tube. The products of combustion from the tube R pass through a water cooler D to eliminate the vapor and are then mixed with a proportionate quantity of hydrocarbon gas from a tube U and pass through the container S in contact with the catalyst. The product of the reaction is discharged from the lower end of the container S into the furnace chamber.

What I claim as my invention is:

1. A method of reacting a gaseous hydrocarbon fuel with air to produce a gas atmosphere consisting essentially of CO, $H_2$ and $N_2$ wherein only a part of hydrocarbon fuel is reacted in the presence of a catalyst, said method comprising first burning a gaseous hydrocarbon fuel with air without the aid of a catalyst to form gaseous products including $CO_2$ and $H_2O$, heating a catalyst indirectly by the combustion, removing from the gaseous products the major portion of the $H_2O$ together with any impurities which are condensable, commingling with said products an additional quantity of gaseous hydrocarbon fuel sufficient to convert the remaining $CO_2$ to CO and $H_2$, and subjecting the mixture to the action of the heated catalyst.

2. A method of reacting a gaseous hydrocarbon fuel with air to produce a gas atmosphere consisting essentially of CO, $H_2$ and $N_2$ wherein only a part of the hydrocarbon fuel is reacted in the presence of a catalyst, said method comprising first burning natural gas with air without the aid of a catalyst to form gaseous products including $CO_2$ and $H_2O$ and minor impurities, heating a catalyst indirectly by the combustion, passing the gaseous products of combustion through a water cooler to eliminate the major portion of the water content thereof together with any impurities which are condensable, commingling with said products an additional limited quantity of natural gas sufficient to convert the remaining $CO_2$ and $H_2O$ to CO and $H_2$, and passing the mixture directly through and in contact with the heated catalyst to bring about the last mentioned reaction.

WALTER H. HOLCROFT.

REFERENCES CITED

The following references are of record in the file of this patent:

UNITED STATES PATENTS

| Number | Name | Date |
|---|---|---|
| 1,979,820 | Bowling | Nov. 6, 1934 |
| 2,051,363 | Beekley | Aug. 18, 1936 |
| 2,135,695 | Bardwell | Nov. 8, 1938 |
| 2,180,376 | Vaughan | Nov. 21, 1939 |
| 2,220,849 | Riblett | Nov. 5, 1940 |
| 2,234,941 | Keith | Mar. 11, 1941 |
| 2,486,879 | Rees et al. | Nov. 1, 1949 |

FOREIGN PATENTS

| Number | Country | Date |
|---|---|---|
| 496,689 | Great Britain | Dec. 5, 1938 |